(12) United States Patent
Tsukui

(10) Patent No.: US 10,118,251 B2
(45) Date of Patent: Nov. 6, 2018

(54) MANUFACTURING METHOD FOR WELDED STRUCTURE

(71) Applicant: TOYOTA JIDOSHA KABUSHIKI KAISHA, Toyota-shi, Aichi-ken (JP)

(72) Inventor: Akira Tsukui, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 316 days.

(21) Appl. No.: 15/219,537

(22) Filed: Jul. 26, 2016

(65) Prior Publication Data
US 2017/0028507 A1    Feb. 2, 2017

(30) Foreign Application Priority Data

Jul. 31, 2015   (JP) ................................ 2015-151591

(51) Int. Cl.

| | |
|---|---|
| *B23K 26/06* | (2014.01) |
| *B23K 26/26* | (2014.01) |
| *H01M 2/02* | (2006.01) |
| *B23K 26/067* | (2006.01) |
| *B23K 26/28* | (2014.01) |
| *B23K 26/32* | (2014.01) |
| *B23K 26/323* | (2014.01) |
| *B23K 26/082* | (2014.01) |
| *H01M 2/04* | (2006.01) |
| *B23K 101/36* | (2006.01) |
| *B23K 103/10* | (2006.01) |
| *B23K 103/18* | (2006.01) |

(52) U.S. Cl.
CPC ........ *B23K 26/0676* (2013.01); *B23K 26/082* (2015.10); *B23K 26/26* (2013.01); *B23K 26/28* (2013.01); *B23K 26/32* (2013.01); *B23K 26/323* (2015.10); *H01M 2/021* (2013.01); *H01M 2/024* (2013.01); *H01M 2/0212* (2013.01); *H01M 2/0237* (2013.01); *H01M 2/0426* (2013.01); *B23K 2201/36* (2013.01); *B23K 2203/10* (2013.01); *B23K 2203/18* (2013.01)

(58) Field of Classification Search
CPC ..... B23K 26/06; B23K 26/26; H01M 2/0212; H01M 2/0237
USPC ............. 219/121.63, 121.64, 121.76, 121.77
See application file for complete search history.

(56) References Cited

U.S. PATENT DOCUMENTS

| | | | | |
|---|---|---|---|---|
| 2007/0084551 A1* | 4/2007 | Watanabe | ........... | B29C 66/8161 156/272.8 |
| 2008/0253410 A1* | 10/2008 | Sakurai | .............. | B23K 26/0613 372/25 |

(Continued)

FOREIGN PATENT DOCUMENTS

| | | | |
|---|---|---|---|
| JP | 2000-233289 A | | 8/2000 |
| JP | 2009-269036 A | | 11/2009 |

(Continued)

*Primary Examiner* — Samuel M Heinrich
(74) *Attorney, Agent, or Firm* — Sughrue Mion, PLLC

(57) ABSTRACT

A manufacturing method includes i) emitting a primary laser beam along a primary trajectory on a boundary between a first member and a second member by a welding apparatus; ii) emitting an advanced laser beam along an advanced trajectory that does not overlap the primary trajectory by the welding apparatus; and iii) emitting a subsequent laser beam along a subsequent trajectory that does not overlap the primary trajectory and the advanced trajectory by the welding apparatus.

3 Claims, 15 Drawing Sheets

(56) References Cited

U.S. PATENT DOCUMENTS

2013/0309000 A1    11/2013   Lin et al.
2014/0124481 A1     5/2014   Yano et al.
2015/0360320 A1    12/2015   Yoshida et al.

FOREIGN PATENT DOCUMENTS

| | | |
|---|---|---|
| JP | 2012-110905 A | 6/2012 |
| JP | 2012-130946 A | 7/2012 |
| JP | 2012-213798 A | 11/2012 |
| JP | 2013-240830 A | 12/2013 |
| JP | 2016-002562 A | 1/2016 |
| WO | 2016/034204 A1 | 3/2016 |

\* cited by examiner

MANUFACTURING METHOD FOR WELDED STRUCTURE

INCORPORATION BY REFERENCE

The disclosure of Japanese Patent Application No. 2015-151591 filed on Jul. 31, 2015 including the specification, drawings and abstract is incorporated herein by reference in its entirety.

BACKGROUND

1. Technical Field

The present disclosure relates to a manufacturing method for a welded structure. In detail, the present disclosure relates to a manufacturing method for a welded structure that is joined by laser welding for emitting a plurality of laser beams thereon.

2. Description of Related Art

Conventionally, laser welding that uses laser beams has been adopted for joining a plurality of members to produce a single welded structure. A battery is one example of a product that is joined by such laser welding. In the battery, an electrode body that includes positive and negative electrode plates is typically accommodated in a case. In a manufacturing process of such a battery, a welding process is occasionally performed. In the welding process, the electrode body is accommodated in a case body through an opening, the opening of the case body is then closed by a sealing plate, and a boundary between the case body and the sealing plate is joined by the laser welding.

For example, a technique of joining the case body and the sealing plate by emitting a low-density laser beam in low power density and a high-density laser beam in higher power density than the low-density laser beam on an area near the boundary between the abutting case body and sealing plate is described in Japanese Patent Application Publication No. 2012-110905 (JP 2012-110905 A). It is also described in JP 2012-110905 A, while the low-density laser beam is emitted on wide ranges of the case body and the sealing plate including the boundary, the two high-density laser beams are emitted such that spots thereof are located inside a spot of the low-density laser beam. It is further described that the two high-density laser beams are respectively emitted on the case body and the sealing plate along the boundary.

However, such a problem that a scan speed of the laser beam cannot be increased is inherent to the above related art. More specifically, in the above related art, energy of the emitted low-density laser beam is in such a magnitude that a temperature of an area ahead of an irradiation position of the high-density laser beam can be increased. Accordingly, the energy is not high enough to melt an irradiation target. Thus, in the case where the scan speed is increased, the temperature of the area ahead of the irradiation position of the high-density laser beam cannot sufficiently be increased by the low-density laser beam. As a result, sufficient joint strength may not be able to be obtained.

Meanwhile, the energy of the low-density laser beam cannot be increased substantially. It is because the low-density laser beam is also emitted on the boundary between the abutting joint targets in the above related art. That is, the boundary between the joint targets may not be completely closed. Thus, so-called laser pass-through in which the low-density laser beam passes through the boundary between the joint targets possibly occurs. In the case where the laser pass-through occurs, the laser beam that has passed through a gap in the boundary between the joint targets may be emitted on a member that is not the joint target (for example, the electrode body), and damage or the like may take place on the member.

SUMMARY

The present disclosure provides a manufacturing method for a welded structure capable of performing laser welding at a high speed while suppressing occurrence of failure.

A manufacturing method for a welded structure according to the present disclosure is a manufacturing method for a welded structure for manufacturing the welded structure by joining a boundary between a first member and a second member that abut against each other by laser welding, in which non-overlapping irradiation is performed by using a welding apparatus for emitting a primary laser beam scanning the boundary between the first member and the second member, an advanced laser beam whose irradiation position is in front of the primary laser beam in a direction of movement, and a subsequent laser beam whose irradiation position is at rear of the primary laser beam in the direction of movement. In the non-overlapping irradiation, the primary laser beam is emitted along a primary trajectory on the boundary between the first member and the second member, the advanced laser beam is emitted along an advanced trajectory that does not overlap the primary trajectory, and the subsequent laser beam is emitted along a subsequent trajectory that does not overlap either the primary trajectory or the advanced trajectory.

In the manufacturing method for the welded structure according to the present disclosure, the advanced laser beam is emitted along the advanced trajectory that differs from the primary trajectory of the primary laser beam that scans the boundary between the first member and the second member. That is, the advanced laser beam does not pass through the boundary between the first member and the second member in the non-overlapping irradiation. Thus, the advanced laser beam can have high energy. In this way, a portion in front of an irradiation position of the primary laser beam can be melted. In addition, because the portion in front of the irradiation position of the primary laser beam is melted, a portion that was the boundary between the first member and the second member can be in a gapless state when the primary laser beam is emitted. Thus, laser pass-through of the primary laser beam can be suppressed. Furthermore, width of a welding mark can sufficiently be secured by the subsequent laser beam that is emitted along the subsequent trajectory that does not overlap with either the primary trajectory or the advanced trajectory. Because a laser beam with high energy can be used as each of the laser beams, laser welding can be performed at a high speed. Moreover, even in the case where the laser beam with the high energy is used as each of the laser beams, occurrence of metal evaporation in a melted portion can be suppressed by the non-overlapping irradiation. In this way, laser welding can be performed at the high speed while occurrence of failure is suppressed.

In addition, in the manufacturing method for the welded structure described above, the welding apparatus may emit the advanced laser beam and the subsequent laser beam in the non-overlapping irradiation such that the irradiation position of the advanced laser beam and the irradiation position of the subsequent laser beam become symmetrical about an inclination axis that passes through an irradiation position of the primary laser beam and is inclined with respect to the primary trajectory, may emit, as the advanced laser beam, a first advanced laser beam whose irradiation position is on the first member side of the primary trajectory and a second advanced laser beam whose irradiation position is on the second member side of the primary trajectory, and may emit, as the subsequent laser beam, a first subsequent laser beam whose irradiation position is on the first member side of the primary trajectory and a second subsequent laser beam whose irradiation position is on the second member side of the primary trajectory. With this configuration, the non-overlapping irradiation can be performed in the same irradiation pattern and under the same condition in segments in which the directions of movement oppose each other.

In addition, in the manufacturing method for the welded structure described above, in the non-overlapping irradiation, a melted section may be formed in front of the irradiation position of the primary laser beam on the primary trajectory by the welding apparatus while the irradiation position of the advanced laser beam is melted by the advanced laser beam, depth of the melted section at the irradiation position of the primary laser beam may be made greater by the primary laser beam than that before irradiation of the primary laser beam, and depth of the melted section at the irradiation position of the subsequent laser beam is made greater by the subsequent laser beam than that before irradiation of the subsequent laser beam.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A detailed description will hereinafter be made on a best mode that embodies the present disclosure with reference to the drawings.

Figure 1:
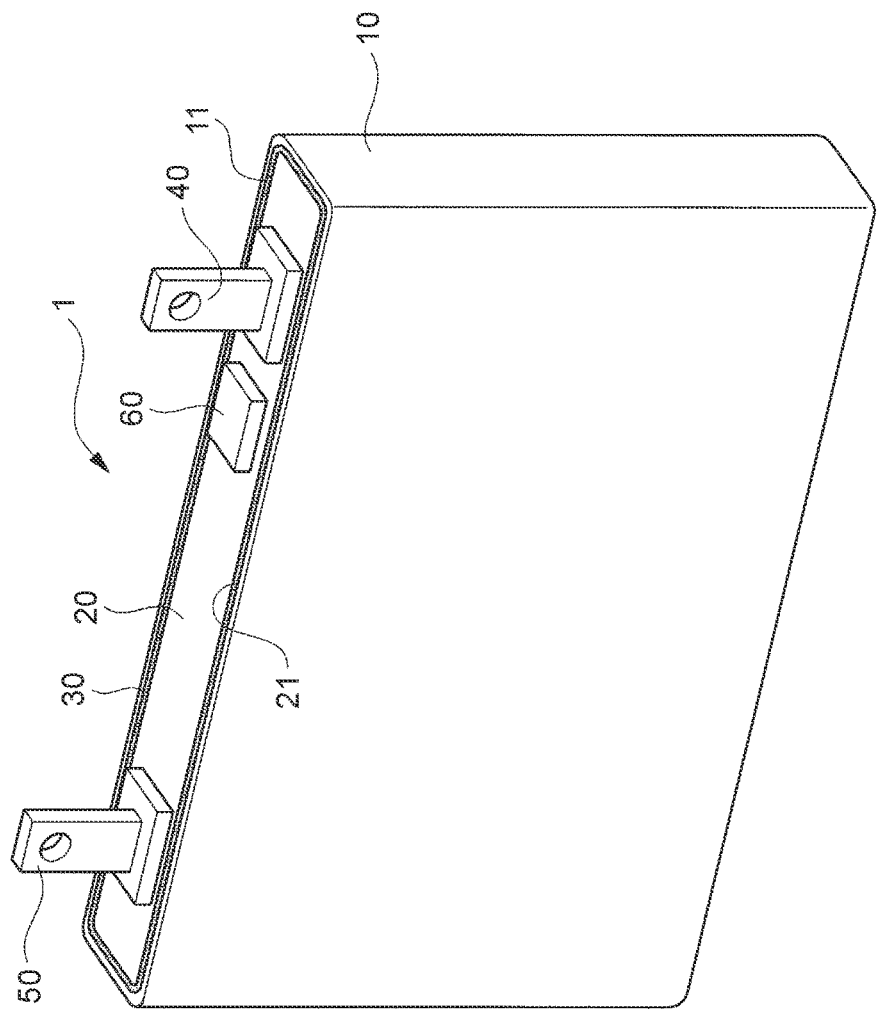
FIG. 1 is a perspective view of a battery according to an embodiment.

FIG. 1 is a perspective view of external appearance of a battery 1 that is a joint target for laser welding according to this embodiment. As shown in FIG. 1, an outer shape of the battery 1 is flat. As shown in FIG. 1, the battery 1 has a positive electrode terminal 40 and a negative electrode terminal 50. The battery 1 is a secondary battery that can be charged and discharged via the positive electrode terminal 40 and the negative electrode terminal 50. As examples of the battery 1, a lithium-ion secondary battery, a nickel hydrogen battery, and the like are raised.

The battery 1 has a case body 10. For charging and discharging, an electrode body that includes positive and negative electrode plates, an electrolyte, and the like are accommodated in the case body 10. An opening 11, through which the electrode body and the like are accommodated, is formed in an upper portion of the case body 10. In FIG. 1, the opening 11 of the case body 10 is closed by a sealing plate 20. In this embodiment, materials of the case body 10 and the sealing plate 20 are aluminum.

The positive electrode terminal 40 and the negative electrode terminal 50 are provided on the sealing plate 20. The sealing plate 20 is also provided with a pouring port sealing member 60 that seals a pouring port, through which the electrolyte is poured. The pouring port sealing member 60 is attached after the electrolyte is poured into the case body 10 through the pouring port.

Furthermore, in the battery 1 of this embodiment, the case body 10 and the sealing plate 20 are joined by laser welding. More specifically, the sealing plate 20 is fitted to the opening 11 of the case body 10, and a boundary between the opening 11 of the case body 10 and a lateral surface 21 of the sealing plate 20 is joined by laser welding for integration. In this way, the case body 10 and the sealing plate 20 are formed as an integrated welded structure.

In addition, a welding mark 30 is formed by laser welding for a whole circumference of a portion that was the boundary between the case body 10 and the sealing plate 20. More specifically, in the view of the external appearance of the battery 1 in FIG. 1, the opening 11 of the case body 10 and the lateral surface 21 of the sealing plate 20 are shown with the reference numerals for the purpose of explanation. However, in reality, areas near the opening 11 of the case body 10 and the lateral surface 21 of the sealing plate 20 are melted, mixed, and formed into the welding mark 30. Thus, the opening 11 of the case body 10 and the lateral surface 21 of the sealing plate 20 do not exist on an outer side of the battery 1. The same can be applied to FIG. 2, which will be described next.

Figure 2:
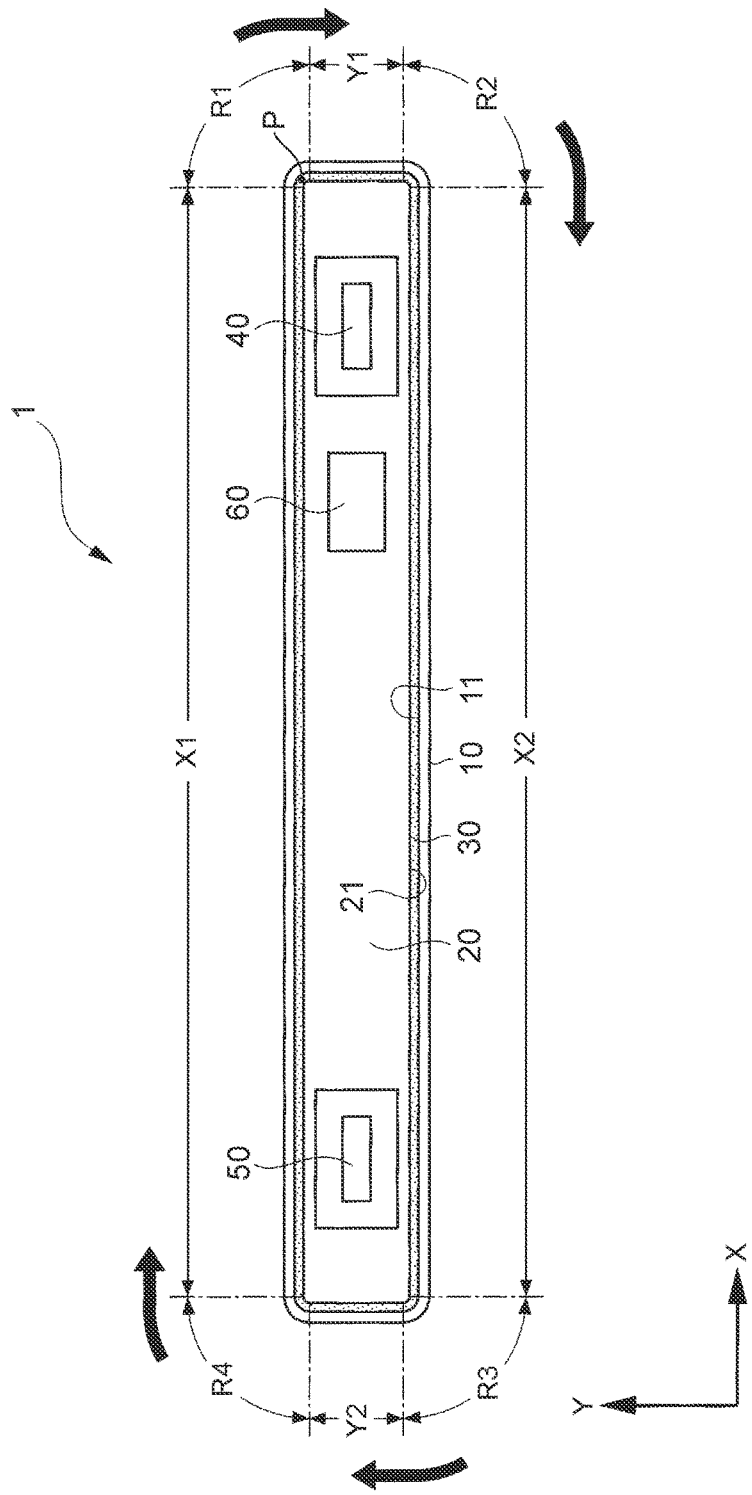
FIG. 2 is a plan view of the battery according to the embodiment.

FIG. 2 is a plan view of the battery 1. As shown in FIG. 2, for the battery 1 in the flat shape, an X-axis direction as a right-left direction is set as a longitudinal direction, and a Y-axis direction as an up-down direction is set as a short direction. Accordingly, the welding mark 30 of this embodiment has a rectangular shape as a whole with the X-axis direction being the longitudinal direction and the Y-axis direction being the short direction.

An irradiation segment of a laser beam in laser welding according to the welding mark 30 has a first longitudinal straight segment X1 and a second longitudinal straight segment X2, both of which are straight segments extending in parallel in the X-axis direction. The irradiation segment of the laser beam also has a first short straight segment Y1 and a second short straight segment Y2, both of which are straight segments extending in parallel in the Y-axis direction. The irradiation segment of the laser beam further has a first curve segment R1, a second curve segment R2, a third curve segment R3, and a fourth curve segment R4, each of which connects two of the above straight segments.

In laser welding, the laser beam scans a circumference of the area near the boundary between the case body 10 and the sealing plate 20 in a clockwise manner from a point P that is shown on the first curve segment R 1. In this way, the welding mark 30 of this embodiment is formed. Note that the point P as a starting point of laser welding is an arbitrary point and thus is not limited to be on the first curve segment R1. In addition, it is preferred that an area near the starting point and an area near an ending point of laser welding appropriately overlap with each other. In this way, the welding mark 30 can be formed seamlessly.

Figure 3:
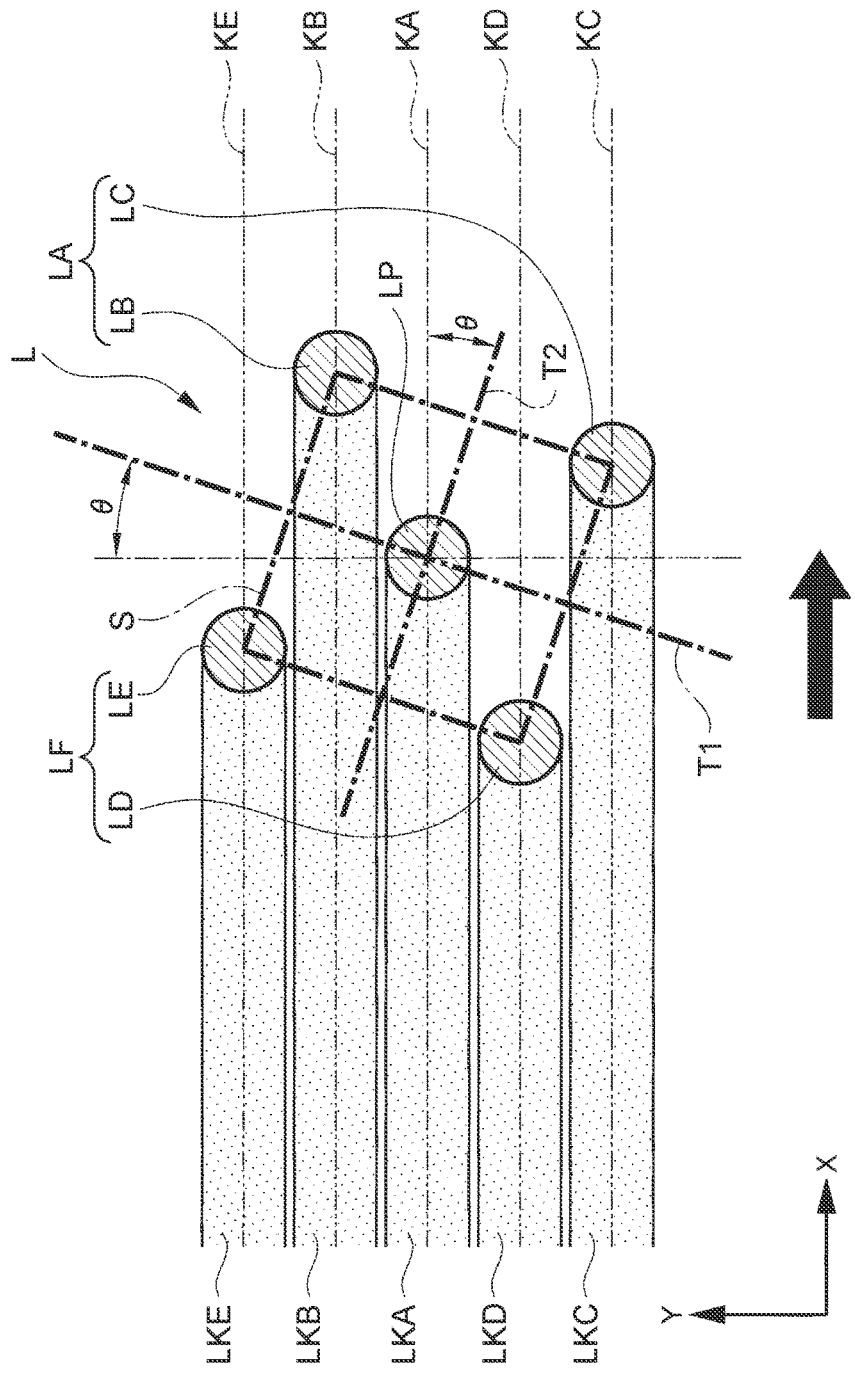
FIG. 3 is a view for explaining laser beams in a first longitudinal straight segment.

FIG. 3 shows a laser beam L that is emitted in laser welding according to this embodiment. FIG. 3 shows an irradiation pattern of the emitted laser beam L on outer surfaces of the case body 10 and the sealing plate 20 as irradiation targets. As shown in FIG. 3, the laser beam L that is emitted in laser welding of this embodiment is configured by including a plurality of laser beams. More specifically, the laser beam L of this embodiment is configured by including a primary laser beam LP and secondary laser beams LB, LC, LD, LE. Note that at least all of the secondary laser beams LB, LC, LD, LE have the same energy in this embodiment.

An irradiation position of the primary laser beam LP is on a boundary between the case body 10 and the sealing plate 20. As shown in FIG. 3, the secondary laser beams LB, LC, LD, LE are arranged such that these serve as vertices of a square S and that the square S surrounds the primary laser beam LP. Furthermore, in this embodiment, the secondary laser beams LB, LC, LD, LE are arranged such that the primary laser beam LP is located at center of gravity of the square S.

FIG. 3 shows an emitting state of the laser beam L on the first longitudinal straight segment X1 and shows a time when the laser beam L moves to the right as indicated by an arrow. Accordingly, of the secondary laser beams LB, LC, LD, LE, the secondary laser beams LB, LC constitute an advanced laser beam LA that is emitted on a portion ahead of a portion that is irradiated with the primary laser beam LP in a direction of movement. Meanwhile, of the secondary laser beams LB, LC, LD, LE, the secondary laser beams LD, LE constitute a subsequent laser beam LF that is emitted on a portion behind the portion that is irradiated with the primary laser beam LP in the direction of movement.

The area near the boundary between the case body 10 and the sealing plate 20 is irradiated with the advanced laser beam LA (the secondary laser beams LB, LC), the primary laser beam LP, and the subsequent laser beam LF (the secondary laser beams LD, LE) in this order. The advanced laser beam LA is used to form a melted section in its irradiation position. The primary laser beam LP is used to make the melted section in the boundary between the case body 10 and the sealing plate 20 sufficiently deep. The subsequent laser beam LF is used to form the melted section in sufficient depth and width in the area near the boundary between the case body 10 and the sealing plate 20. Note that the first longitudinal straight segment X1 is longer than a distance between the secondary laser beam LB that is located at the forefront in the direction of movement and the secondary laser beam LD that is located at the rearmost in direction of movement.

FIG. 3 shows tracks KA, KB, KC, KD, KE of the primary laser beam LP and the secondary laser beams LB, LC, LD, LE. More specifically, the primary laser beam LP and the secondary laser beams LB, LC, LD, LE are emitted such that the center of each thereof moves on each of the tracks KA, KB, KC, KD, KE. The tracks KA, KB, KC, KD, KE respectively extend in the directions of movement of the primary laser beam LP and the secondary laser beams LB, LC, LD, LE. FIG. 3 also shows irradiation trajectories of the primary laser beam LP and the secondary laser beams LB, LC, LD, LE that are formed by movement to the right along the tracks KA, KB, KC, KD, KE as irradiation trajectories LKA, LKB, LKC, LKD, LKE.

As shown in FIG. 3, the secondary laser beams LB, LC, LD, LE are emitted in such arrangement that the square S is inclined with respect to the direction of movement of the laser beam L. More specifically, as shown in FIG. 3, an axis T1 as a line segment that passes through a middle point between the secondary laser beams LB, LE and a middle point between the secondary laser beams LC, LD is inclined with respect to the track KA of the primary laser beam LP. Accordingly, an axis T2 as a line segment that passes through a middle point between the secondary laser beams LB, LC and a middle point between the secondary laser beams LD, LE is also inclined with respect to the track KA of the primary laser beam LP. FIG. 3 shows each of an inclination angle of the axis T1 with respect to a direction that is orthogonal to the track KA of the primary laser beam LP and an inclination angle of the axis T2 with respect to the track KA of the primary laser beam LP by an angle $\theta$.

The laser beam L of this embodiment is emitted in such arrangement that the advanced laser beam LA (the secondary laser beams LB, LC) and the subsequent laser beam LF (the secondary laser beams LD, LE) are symmetrical about the axis Ti that passes through the irradiation position of the primary laser beam LP and is inclined with respect to the track KA.

In addition, as shown in FIG. 3, the angle $\theta$ of each of the axes T1, T2 is set as such an angle that any two of the irradiation trajectories LKA, LKB, LKC, LKD, LKE do not overlap with each other in this embodiment. That is, in this embodiment, laser welding during a time when the primary laser beam LP scans the track KA in the first longitudinal straight segment X1 is performed by non-overlapping irradiation in which the irradiation trajectories LKA, LKB, LKC, LKD, LKE are irradiated in such a manner that any two thereof do not overlap with each other.

More specifically, as shown in FIG. 3, the secondary laser beams LB, LC as the advanced laser beam LA are respectively emitted along the irradiation trajectories LKB, LKC that do not overlap the irradiation trajectory LKA of the primary laser beam LP in this embodiment. In addition, the secondary laser beams LD, LE as the subsequent laser beam LF are respectively emitted along the irradiation trajectories LKD, LKE that do not overlap the irradiation trajectory LKA of the primary laser beam LP and the irradiation trajectories LKB, LKC of the secondary laser beams LB, LC as the advanced laser beam LA. A detailed description will be made below on this non-overlapping irradiation.

Furthermore, as shown in FIG. 3, the angle $\theta$ is set as an angle in such a degree that a gap is formed between any two of the irradiation trajectories LKA, LKB, LKC, LKD, LKE in this embodiment. Note that the angle $\theta$ may be set as an angle at which adjacent ones of the irradiation trajectories LKA, LKB, LKC, LKD, LKE contact each other.

In laser welding of this embodiment, the irradiation pattern of the laser beam L, which is shown in FIG. 3, is retained while the direction of movement thereof is changed. The laser beam L moves on a circumference along the area near the boundary between the case body 10 and the sealing plate 20. That is, in laser welding of this embodiment, the arrangement of the secondary laser beams LB, LC, LD, LE with respect to the primary laser beam LP is not changed from the arrangement of the irradiation patterns, which is shown in FIG. 3, while the laser beam L moves along the circumference of the area near the boundary between the case body 10 and the sealing plate 20. The irradiation pattern of the laser beam L does not rotate with respect to the battery 1 while the laser beam L moves along the circumference of the area near the boundary between the case body 10 and the sealing plate 20.

Figure 4:
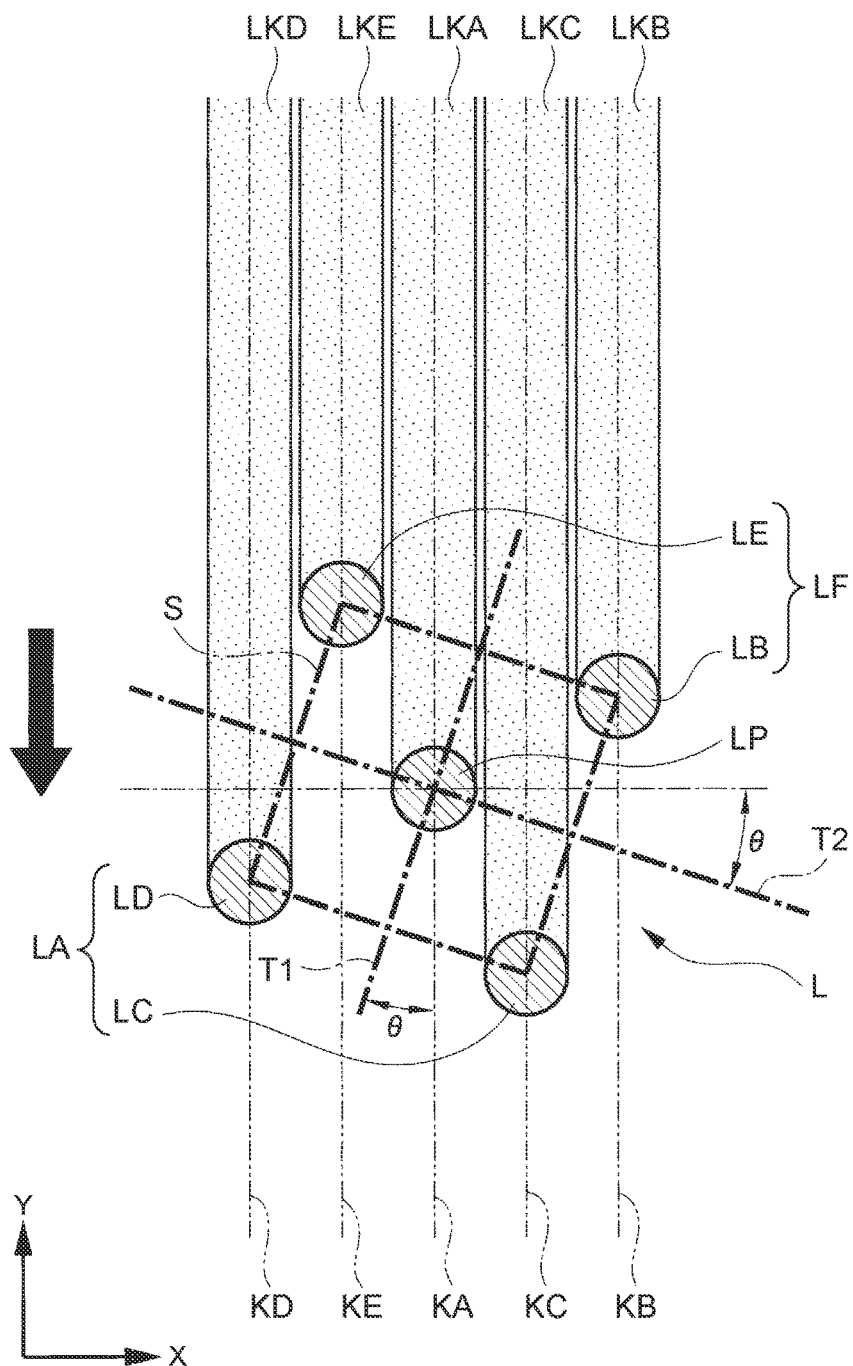
FIG. 4 is a view for explaining the laser beams in a first short straight segment.

FIG. 4 shows an emitting state of the laser beam L on the first short straight segment Y1 that has been described in FIG. 2. More specifically, FIG. 4 shows a time when the laser beam L moves downward as indicated by an arrow. In an irradiation pattern of the laser beam L in the first short straight segment Y1, the arrangement of the primary laser beam LP and the secondary laser beams LB, LC, LD, LE is the same as that in FIG. 3. Also, in the first short straight segment Y1, an irradiation position of the primary laser beam LP is the boundary between the case body 10 and the sealing plate 20.

In FIG. 4, the advanced laser beam LA is configured by including the secondary laser beams LC, LD. In FIG. 4, the subsequent laser beam LF is configured by including the secondary laser beams LB, LE. It is because the irradiation patterns shown in FIG. 3 remain the same and only the direction of movement is changed in FIG. 4. Note that the first short straight segment Y1 is also longer than a distance between the secondary laser beam LC that is located at the forefront in the direction of movement and the secondary laser beam LE that is located at the rearmost in direction of movement.

Also in FIG. 4, the advanced laser beam LA (the secondary laser beams LC, LD) and the subsequent laser beam LF (the secondary laser beams LB, LE) are emitted in symmetrical arrangement about the axis T2 that passes through the irradiation position of the primary laser beam LP and is inclined with respect to the track KA.

As it has been described by using FIG. 3, the angle θ as the inclination angle of each of the axes T1, T2 is set as such an angle that any two of the irradiation trajectories LKA, LKB, LKC, LKD, LKE do not overlap with each other in the first longitudinal straight segment X1. In addition, the arrangement of the secondary laser beams LB, LC, LD, LE is the arrangement that constitutes the square S. Accordingly, similar to the first longitudinal straight segment X1, laser welding on the first short straight segment Y1 is also performed by the non-overlapping irradiation. That is, laser welding during a time when the primary laser beam LP scans the track KA in the first short straight segment Y1 is performed by the non-overlapping irradiation in which the irradiation trajectories LKA, LKB, LKC, LKD, LKE are irradiated in such a manner that any two thereof do not overlap with each other.

Note that, in the second longitudinal straight segment X2 that is provided to oppose the first longitudinal straight segment X1, laser welding is performed by reversing the direction of movement of the laser beam L (to a left direction) from the direction (a right direction) in the first longitudinal straight segment X1. Accordingly, the advanced laser beam LA is configured by including the secondary laser beams LD, LE in the second longitudinal straight segment X2. The subsequent laser beam LF is configured by including the secondary laser beams LB, LC in the second longitudinal straight segment X2. Note that the second longitudinal straight segment X2 is also longer than a distance between the secondary laser beam LD that is located at the forefront in the direction of movement and the secondary laser beam LB that is located at the rearmost in direction of movement.

Also in the second longitudinal straight segment X2, the advanced laser beam LA (the secondary laser beams LD, LE) and the subsequent laser beam LF (the secondary laser beams LB, LC) are emitted in symmetrical arrangement about the axis Ti that passes through the irradiation position of the primary laser beam LP and is inclined with respect to the track KA. Laser welding of the second longitudinal straight segment X2 is also performed by the non-overlapping irradiation. More specifically, laser welding during a time when the primary laser beam LP scans the track KA in the second longitudinal straight segment X2 is performed by the non-overlapping irradiation in which the irradiation trajectories LKA, LKB, LKC, LKD, LKE are irradiated in such a manner that any two thereof do not overlap with each other. That is, laser welding by the laser beam L can be performed in the second longitudinal straight segment X2 under the same condition as the first longitudinal straight segment X1.

In the second short straight segment Y2 that is provided to oppose the first short straight segment Y1, laser welding is performed by reversing the direction of movement of the laser beam L (to an up direction) from the direction in the first short straight segment Y1 (a down direction) shown in FIG. 4. Accordingly, the advanced laser beam LA is configured by including the secondary laser beams LB, LE in the second short straight segment Y2. The subsequent laser beam LF is configured by including the secondary laser beams LC, LD in the second short straight segment Y2. Note that the second short straight segment Y2 is also longer than a distance between the secondary laser beam LE that is located at the forefront in the direction of movement and the secondary laser beam LC that is located at the rearmost in direction of movement.

Also in the second short straight segment Y2, the advanced laser beam LA (the secondary laser beams LB, LE) and the subsequent laser beam LF (the secondary laser beams LC, LD) are emitted in symmetrical arrangement about the axis T2 that passes through the irradiation position of the primary laser beam LP and is inclined with respect to the track KA. Laser welding of the second short straight segment Y2 is also performed by the non-overlapping irradiation. More specifically, laser welding during a time when the primary laser beam LP scans the track KA in the second short straight segment Y2 is performed by the non-overlapping irradiation in which the irradiation trajectories LKA, LKB, LKC, LKD, LKE are irradiated in such a manner that any two thereof do not overlap with each other. That is, laser welding by the laser beam L can also be performed in the second short straight segment Y2 under the same condition as the first short straight segment Y1.

Figure 5:
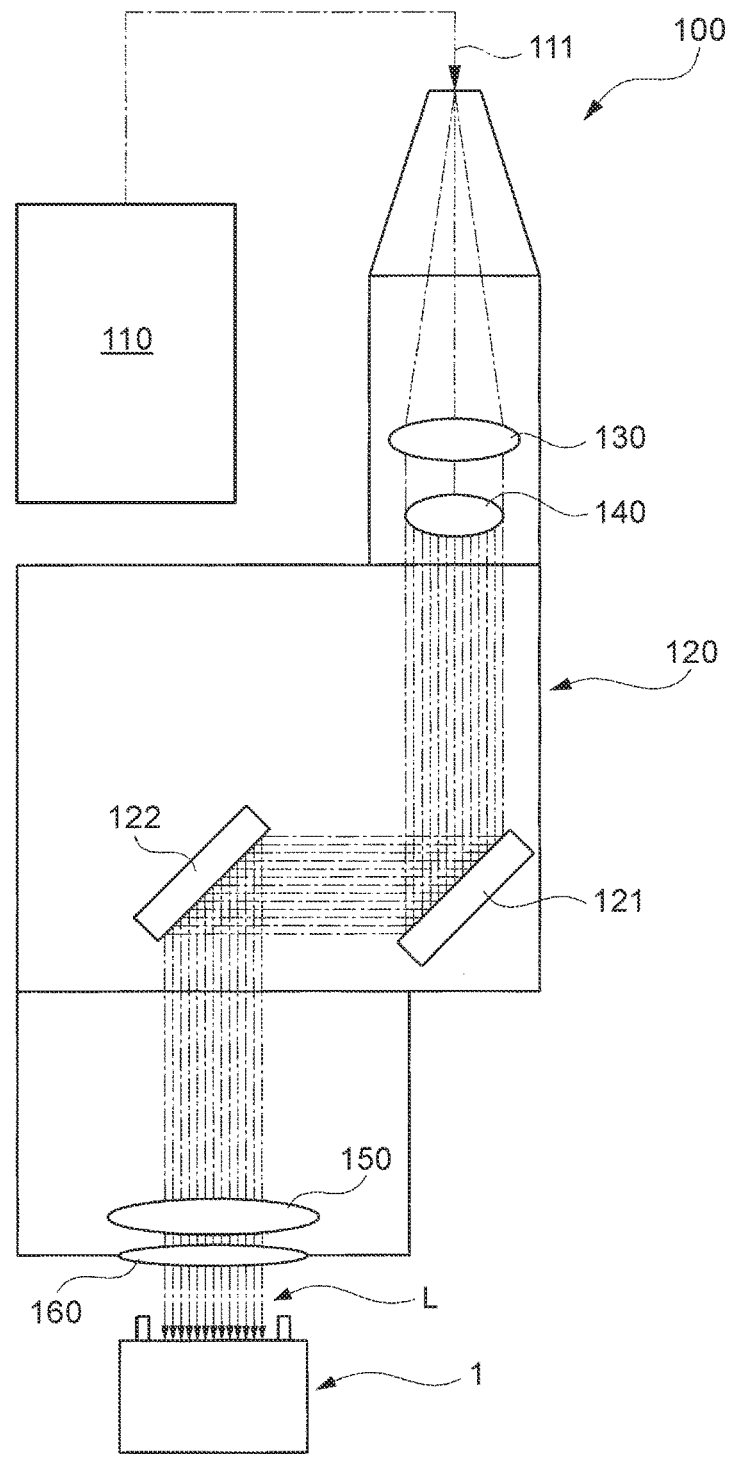
FIG. 5 is a schematic configuration diagram of a welding apparatus.

Next, a description will be made on a welding apparatus 100 for performing laser welding of this embodiment by using FIG. 5. FIG. 5 is a schematic configuration diagram of the welding apparatus 100 that emits the above laser beam L on the battery 1.

As shown in FIG. 5, the welding apparatus 100 of this embodiment has a laser oscillator 110 and a galvano scanner 120. The galvano scanner 120 has a pair of reflective mirrors (galvano mirrors) 121, 122. The galvano scanner 120 also has a collimating lens 130, a diffractive optical element (DOE) 140, an FO lens 150, and a protective lens 160.

The collimating lens 130 can adjust laser beams that are emitted by the laser oscillator 110 and enter through an optical fiber 111 to be in a parallel state. The DOE 140 adjusts the irradiation pattern of the laser beam L. That is, in the welding apparatus 100 of this embodiment, the irradiation pattern of the laser beam L, which includes the primary laser beam LP and the secondary laser beams LB, LC, LD, LE, is determined by the DOE 140.

The reflective mirrors 121, 122 are each rotated by a motor, and angles thereof are thereby adjusted. The FO lens 150 corrects the laser beam L such that a scan speed thereof becomes constant.

Figure 6:
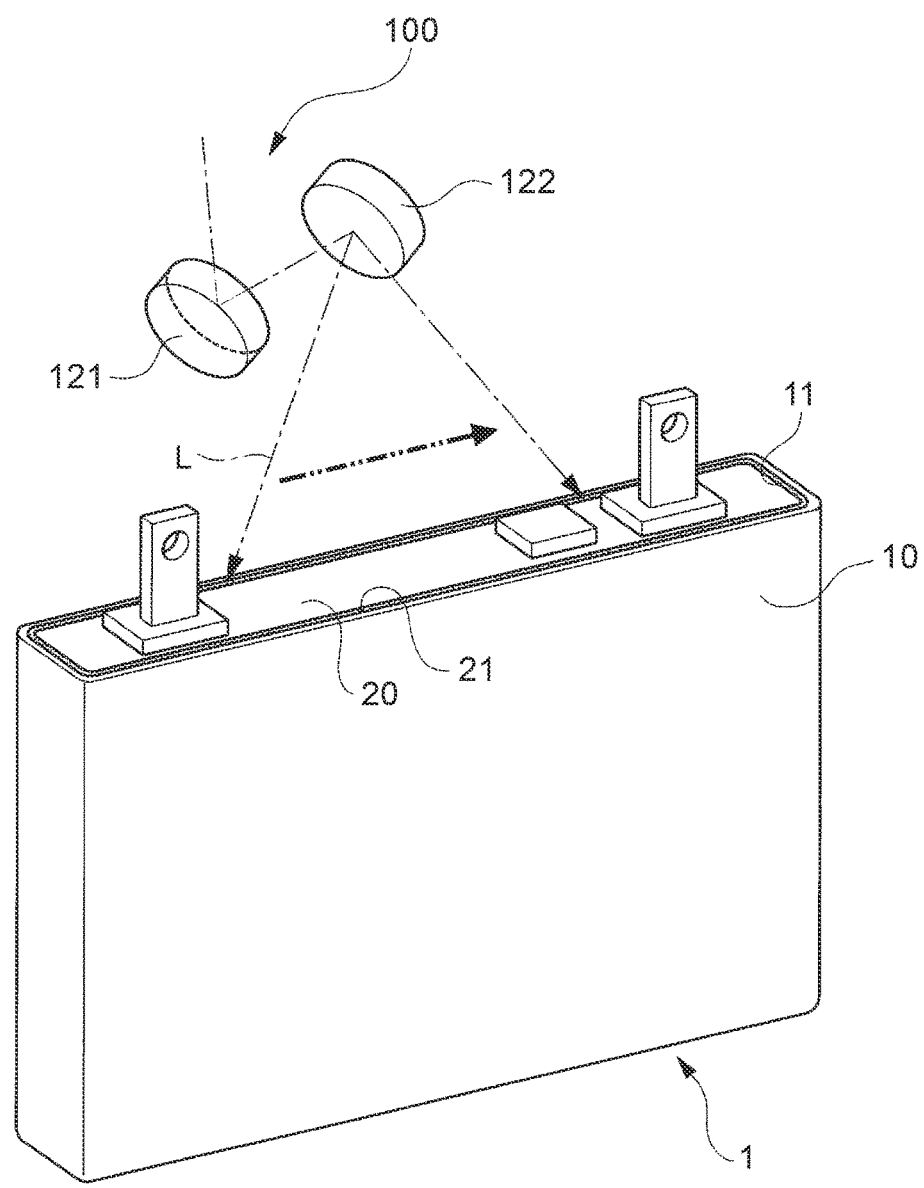
FIG. 6 is a perspective view that shows an irradiation state of a laser beam by the welding apparatus.

With rotation of the reflective mirrors 121, 122, the galvano scanner 120 can accurately emit the laser beam L at a predetermined position. That is, with the rotation of the reflective mirrors 121, 122, the galvano scanner 120 enables a high-speed scan by the laser beam L. In other words, as shown in FIG. 6, with the rotation of the reflective mirrors 121, 122, the welding apparatus 100 can emit the laser beam L along the circumference of the area near the boundary between the case body 10 and the sealing plate 20.

Note that a welding apparatus for performing laser welding is not limited to the welding apparatus 100 shown in FIG. 5 but may have a different configuration as long as the welding apparatus can emit the laser beam L. For example, an apparatus that has a laser oscillator, a pair of reflective mirrors (galvano mirrors), and the like can be used for each of the primary laser beam LP and the secondary laser beams LB, LC, LD, LE.

Next, a description will be made on the non-overlapping irradiation in the laser welding of this embodiment. In this embodiment, the non-overlapping irradiation is performed on the first longitudinal straight segment X1, the second longitudinal straight segment X2, the first short straight segment Y1, and the second short straight segment Y2, each of which is a straight segment.

Figure 7:
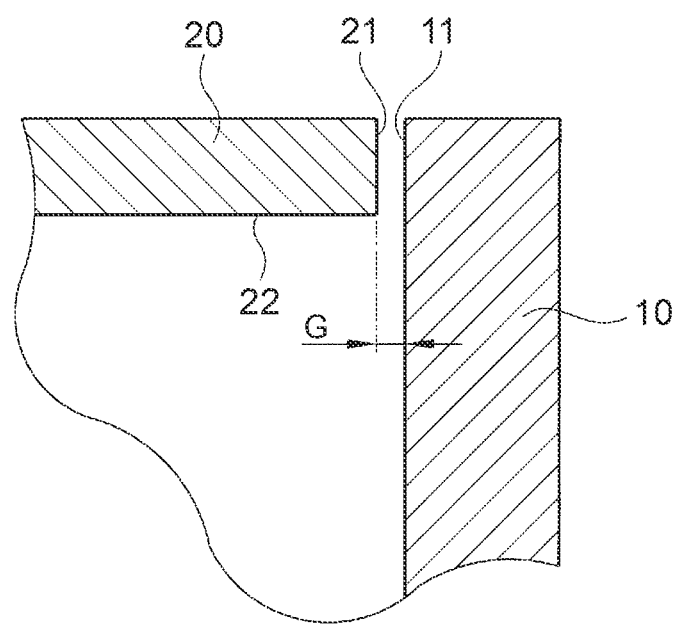
FIG. 7 is a cross-sectional view of a straight segment before laser welding is performed.

FIG. 7 is a cross-sectional view of the area near the boundary between the case body 10 and the sealing plate 20 in the first longitudinal straight segment X1, the second longitudinal straight segment X2, the first short straight segment Y1, and the second short straight segment Y2 before laser welding is performed. That is, FIG. 7 shows a state where the sealing plate 20 is fitted to the opening 11 of the case body 10, and the opening 11 of the case body 10 and the lateral surface 21 of the sealing plate 20 abut against each other while opposing each other.

As shown in FIG. 7, a gap G is formed between the opening 11 of the case body 10 and the lateral surface 21 of the sealing plate 20. The gap G is provided to fit the sealing plate 20 to the opening 11 of the case body 10. This gap G is in such size that, in the case where the primary laser beam LP of the laser beam L is emitted, a portion thereof passes through the gap G.

Figure 8:
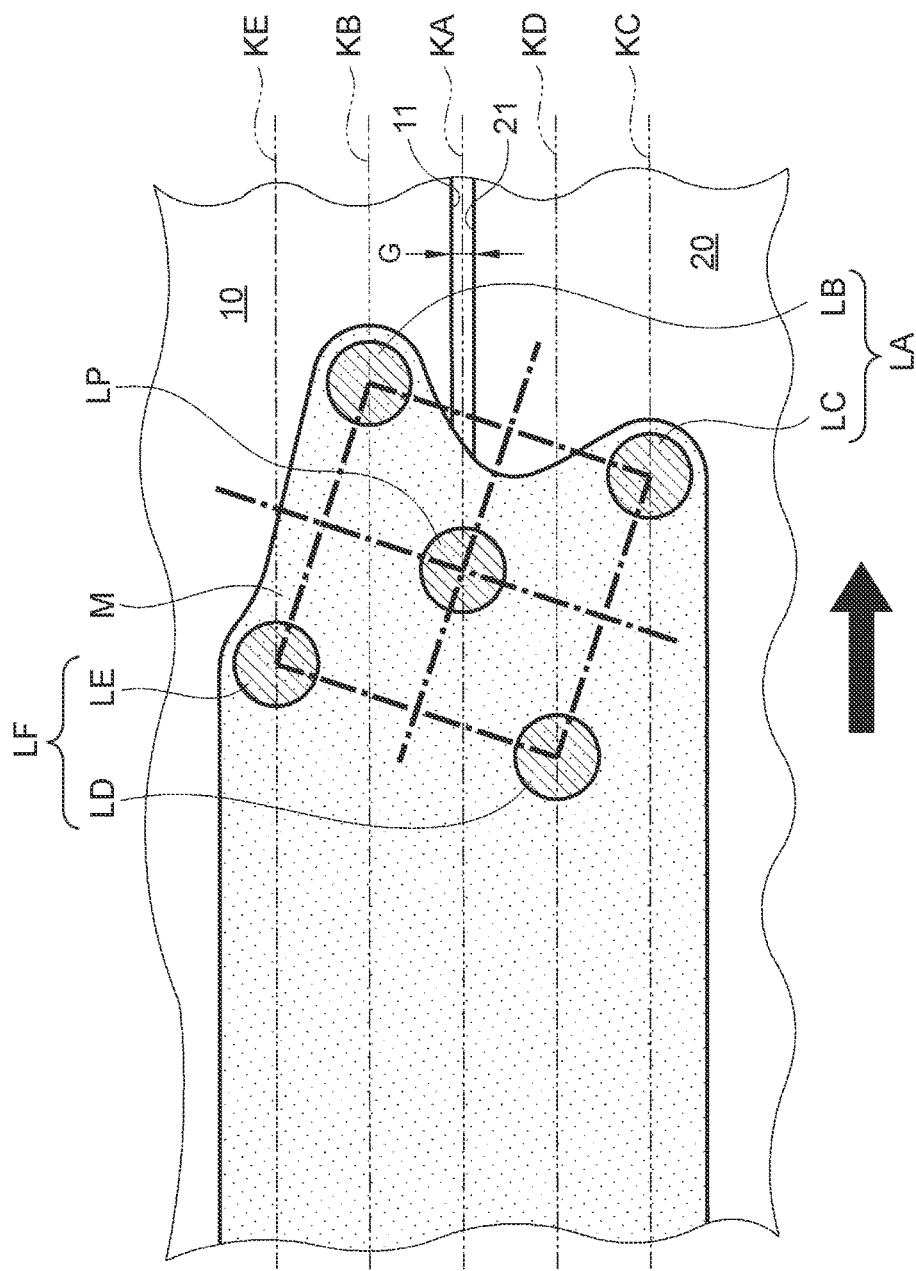
FIG. 8 is a plan view of a first longitudinal straight segment during laser welding.

FIG. 8 is a plan view of the first longitudinal straight segment X1 during laser welding. As shown in FIG. 8, in the area near the boundary between the case body 10 and the sealing plate 20 that is irradiated with the laser beam L, a melted section M, in which these are melted, is formed. A portion of the melted section M is in such a state where the melted case body 10 and sealing plate 20 are mixed.

As shown in FIG. 8, the primary laser beam LP is emitted while moving along the track KA that is provided in the boundary between the case body 10 and the sealing plate 20. In addition, the secondary laser beams LB, LC, which constitute the advanced laser beam LA, are emitted by the non-overlapping irradiation while respectively moving along the track KB that is provided on the case body 10 side from the track KA and the track KC that is provided on the sealing plate 20 side from the track KA. Furthermore, the secondary laser beams LD, LE, which constitute the subsequent laser beam LF, are emitted by the non-overlapping irradiation while respectively moving along the track KD that is provided on the sealing plate 20 side from the track KA and the track KE that is provided on the case body 10 side from the track KA.

Figure 9:
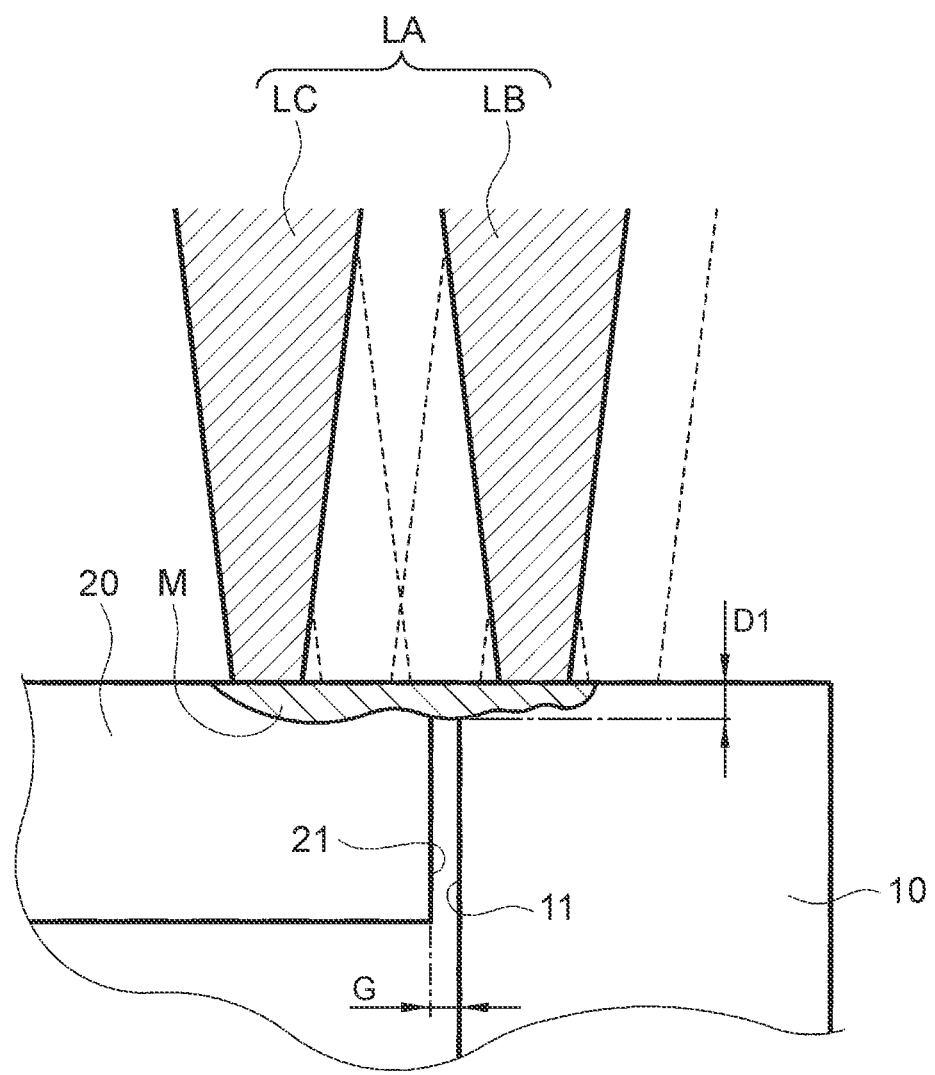
FIG. 9 is a cross-sectional view of a melted section that is formed by irradiation of an advanced laser beam.

In this way, as shown in FIG. 9, the melted section M is first formed in the area near the boundary between the case body 10 and the sealing plate 20 through irradiation of the advanced laser beam LA. The melted section M is formed when the area near the boundary between the case body 10 and the sealing plate 20 is melted. A portion of the melted section M flows into a position where the gap G is formed and thereby closes the gap G. FIG. 9 shows depth D1 of the melted section M, which is formed by the irradiation of the advanced laser beam LA.

Note that irradiation positions of the advanced laser beam LA are on the case body 10 and the sealing plate 20 but is not on the boundary therebetween. Accordingly, there is no possibility that the advanced laser beam LA passes through the gap G, which is formed in the boundary between the case body 10 and the sealing plate 20, and is emitted on the inside of the battery 1.

Figure 10:
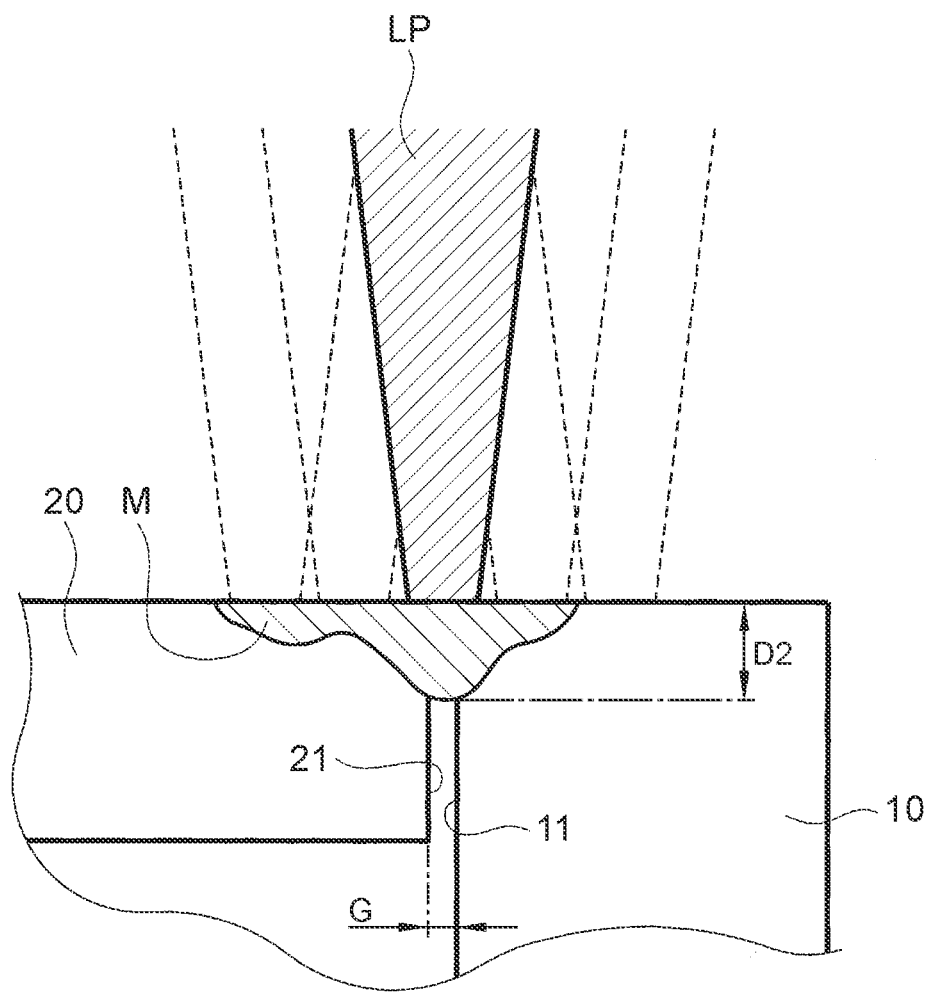
FIG. 10 is a cross-sectional view of the melted section at a time when a primary laser beam is emitted thereon.

Next, as shown in FIG. 10, the melted section M, which is formed when the advanced laser beam LA passes therethrough, is irradiated with the primary laser beam LP. As shown in FIG. 10, in the melted section M that is irradiated with the primary laser beam LP, depth of a portion thereof is increased as the portion is closer to the irradiation position of the primary laser beam LP. FIG. 10 shows depth D2 of the melted section M in the irradiation position of the primary laser beam LP. Due to the irradiation of the primary laser beam LP, the depth D2 of the melted section M becomes greater than the depth D1 thereof before the irradiation of the primary laser beam LP. In this way, the depth D2 of the portion of the melted section M that was the boundary between the case body 10 and the sealing plate 20 becomes substantially deep by the irradiation of the primary laser beam LP.

In this embodiment, when the primary laser beam LP is emitted, the gap G is closed due to the melted section M that has been formed by the irradiation of the advanced laser beam LA and that has flowed thereinto. Accordingly, there is no possibility that the primary laser beam LP emitted on the portion that was the gap G is not emitted on the inside of the battery 1.

Figure 11:
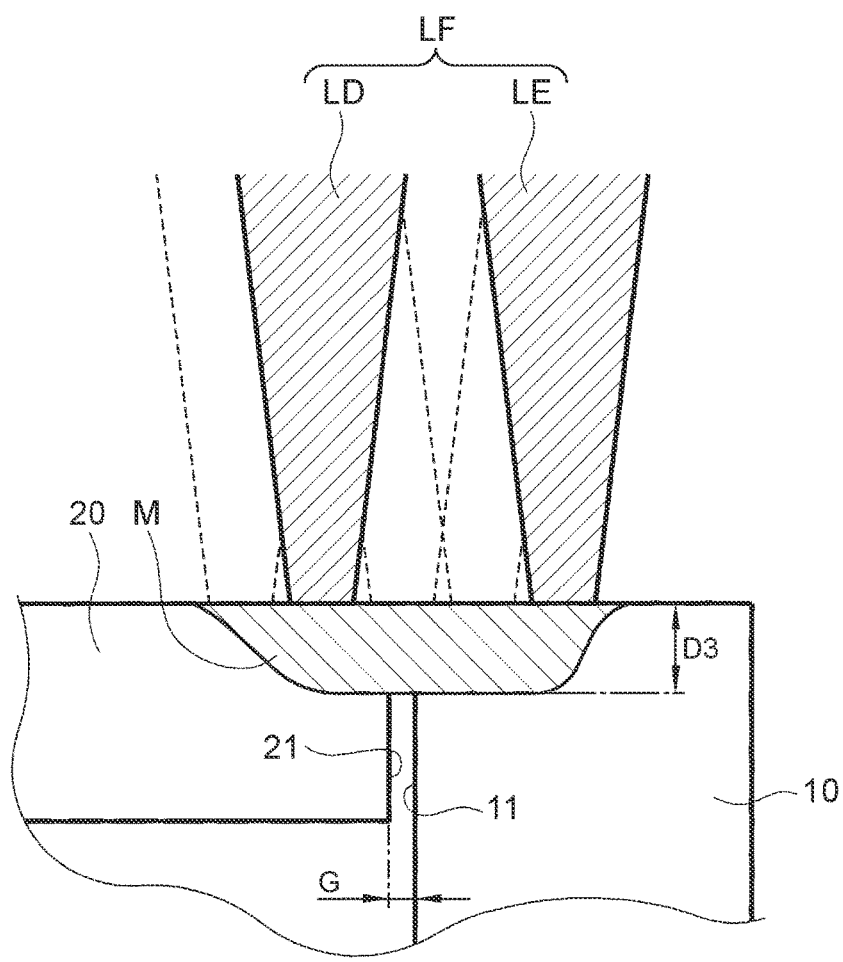
FIG. 11 is a cross-sectional view of the melted section at a time when a subsequent laser beam is emitted thereon.

Next, as shown in FIG. 11, the melted section M after the primary laser beam LP passes therethrough is irradiated with the subsequent laser beam LF. As shown in FIG. 11, due to irradiation of the subsequent laser beam LF, portions of the melted section M near ends in a width direction (the right-left direction) with respect to the direction of movement become deeper than those shown in FIG. 10. That is, as shown in FIG. 11, the portion of the melted section M that extends to the vicinity of the ends in the width direction is in depth D3 that is greater than the depth D1. Note that the depth D3 shown in FIG. 11 is substantially the same depth as the depth D2 shown in FIG. 10.

The subsequent laser beam LF is not emitted on the inside of the battery 1, either. It is because irradiation positions of the subsequent laser beam LF are on the case body 10 and on the sealing plate 20. It is also because the gap G is closed due to formation of the melted section M. That is, in this embodiment, the laser beam L is suppressed from being emitted on the inside of the battery 1 while the non-overlapping irradiation is performed. In this way, damage to the electrode body and the like that are accommodated in the battery 1 and subsequent occurrence of failure are suppressed.

The melted section M that is formed by laser welding in this embodiment is hardened and becomes the welding mark 30 after the subsequent laser beam LF passes therethrough. In the welding mark 30 that is formed by the non-overlapping irradiation, the substantial depth and the substantial width are secured, and welding failure is suppressed.

That is, a rate of absorbing energy of the laser beam is higher in the melted section M that has already been melted than a material that is not melted. Accordingly, the melted section M is in such a state where advancement thereof is facilitated. Thus, the depth of the melted section M that is irradiated with the primary laser beam LP and the subsequent laser beam LF can be made sufficient. Furthermore, the melted section M has the sufficient depth because the subsequent laser beam LF is emitted on the ends in the width direction of the melted section M with respect to the irradiation position of the primary laser beam LP by the non-overlapping irradiation.

In the case where a high-energy laser beam is emitted on a welding material in an overlapping manner, an amount of heat input to a portion where overlapping irradiation occurs tends to be excessively large. Accordingly, in the case where the high-energy laser beam is emitted on the welding material in the overlapping manner, welding failure possibly occurs due to metal evaporation. On the contrary, in the non-overlapping irradiation in laser welding of this embodiment, none of the primary laser beam LP and the secondary laser beams LB, LC, LD, LE is emitted on the same position in the overlapping manner. Accordingly, high-energy laser beams can be emitted as the primary laser beam LP and the secondary laser beams LB, LC, LD, LE in such a degree that the sufficient depth of the melted section M can be secured. Thus, the welding mark 30 with sufficient strength can continuously be formed without occurrence of the welding failure.

Furthermore, as the primary laser beam LP and the secondary laser beams LB, LC, LD, LE, the high-energy laser beams can be emitted by the non-overlapping irradiation. Accordingly, the scan speed of the laser beam L can be increased, and laser welding can be performed at a high speed. Thus, in this embodiment, laser welding can be performed at the high speed by the non-overlapping irradiation while the occurrence of the failure is suppressed.

Noted that FIG. 8 shows the first longitudinal straight segment X1 and the same applies, as the other straight segments, to the second longitudinal straight segment X2, the first short straight segment Y1, and the second short straight segment Y2. It is because, in the second longitudinal straight segment X2, the first short straight segment Y1, and the second short straight segment Y2, the non-overlapping irradiation by the advanced laser beam LA, the primary laser beam LP, and the subsequent laser beam LF can be performed in the similar manner to that in the first longitudinal straight segment X1.

That is, in this embodiment, the laser beam L is used in such an irradiation pattern that the primary laser beam LP is located at the center of gravity of the square S with the secondary laser beams LB, LC, LD, LE being the vertices. Furthermore, all of the secondary laser beams LB, LC, LD, LE have the same magnitude of the energy. Accordingly, in this embodiment, the non-overlapping irradiation can be performed in all of the straight segments under a similar condition. Thus, the welding mark 30 can uniformly be formed in all of the straight segments without the occurrence of the failure.

Next, a description will be made on the first curve segment R1, the second curve segment R2, the third curve segment R3, and the fourth curve segment R4, each of which is located between the straight segments.

As described above, in laser welding of this embodiment, the laser beam L moves along the circumference of the area near the boundary between the case body 10 and the sealing plate 20 while the above irradiation pattern remains the same and only the direction of movement is changed. Accordingly, in the first curve segment R1, the second curve segment R2, the third curve segment R3, and the fourth curve segment R4, there is a case where the advanced laser beam LA that is located in front of the primary laser beam LP in the direction of movement crosses the gap G between the case body 10 and the sealing plate 20.

Figure 12:
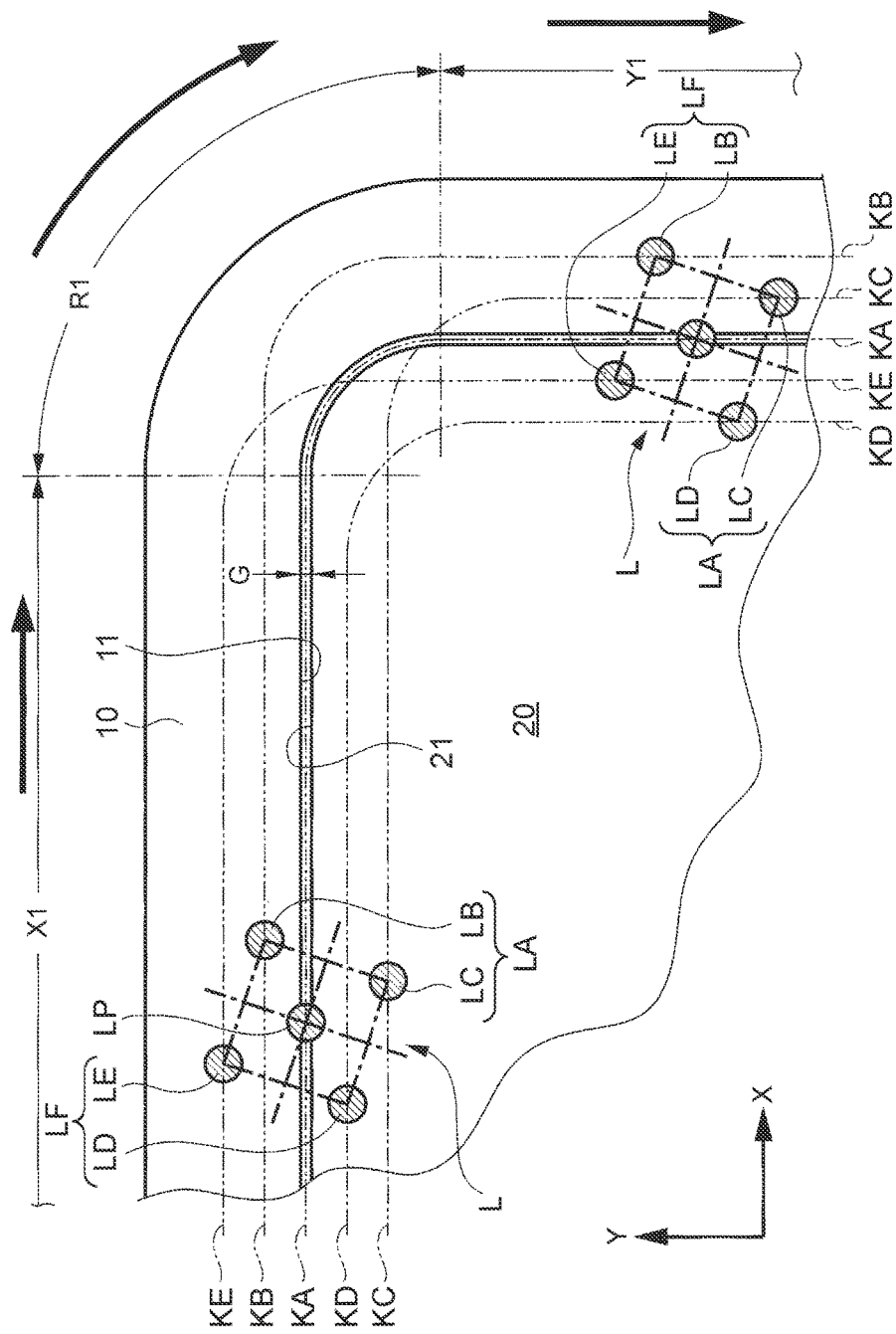
FIG. 12 is a plan view for explaining a track of laser beams in a curve segment.

FIG. 12 shows the tracks KA, KB, KC, KD, KE in the first curve segment R1. As shown in FIG. 12, the tracks KC, KE crosses the position of the gap G in the first curve segment R1. Of them, the track KE relates to the secondary laser beam LE, which constitutes the subsequent laser beam LF in both of the first longitudinal straight segment X1 and the first short straight segment Y1. Accordingly, the secondary laser beam LE crosses the position of the gap G when the gap G has already been closed by the melted section M. Thus, there is no possibility that the secondary laser beam LE is not emitted on the inside of the battery 1 by passing through the gap G.

Meanwhile, the track KC relates to the secondary laser beam LC, which constitutes the advanced laser beam LA in the first longitudinal straight segment X1 and the first short straight segment Y1. Accordingly, in the case where the laser welding is performed at the high speed, the secondary laser beam LC possibly crosses the gap G before the formation of the melted section M in the first curve segment R1. Regarding this point, the same applies to the second curve segment R2, the third curve segment R3, and the fourth curve segment R4 that are the curve segments other than the first curve segment R1. That is, the secondary laser beam, which constitutes the advanced laser beam LA in the straight segments before and after the curve segment, possibly crosses the gap G in the curve segment between those straight segments. Accordingly, in this embodiment, the laser beam is prevented from passing through the gap G and being emitted on the inside of the battery 1 in the first curve segment R1, the second curve segment R2, the third curve segment R3, and the fourth curve segment R4.

Figure 13:
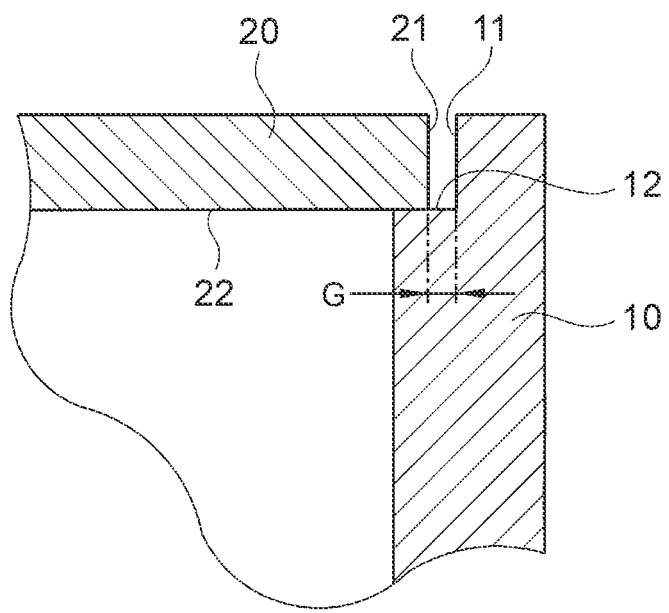
FIG. 13 is a cross-sectional view of the curve segment before laser welding is performed.

FIG. 13 is a cross-sectional view of the first curve segment R1, the second curve segment R2, the third curve segment R3, and the fourth curve segment R4 before laser welding is performed. As shown in FIG. 13, a support surface 12 that is projected to the inside from the opening 11 is provided on a lower side of the opening 11 of the case body 10 in the first curve segment R1, the second curve segment R2, the third curve segment R3, and the fourth curve segment R4. The support surface 12 is a surface for receiving an inner surface 22 of the sealing plate 20 that is fitted to the opening 11 of the case body 10.

Accordingly, even in the case where the laser beam enters the gap G in the first curve segment R1, the second curve segment R2, the third curve segment R3, and the fourth curve segment R4, the support surface 12 of the case body 10 is irradiated with the entered laser beam. Thus, in this embodiment, also in the first curve segment R1, the second curve segment R2, the third curve segment R3, and the fourth curve segment R4, the laser beam is suppressed from being emitted on the inside of the battery 1.

In this embodiment, as described above, the point P, which is shown on the first curve segment R1, is set as the starting point of laser welding. In this way, also at the beginning of the irradiation of the laser beam L, the primary laser beam LP is suppressed from being emitted on the inside of the battery 1. That is, the damage to the electrode body and the like that are accommodated in the battery 1 and the subsequent occurrence of the failure are suppressed.

A description will hereinafter be made on an experiment that is conducted to confirm effects of the non-overlapping irradiation according to this embodiment. In this experiment, an example in which laser welding is performed by the non-overlapping irradiation, and comparative examples in each of which laser welding is performed such that irradiation trajectories of an advanced laser beam and a subsequent laser beam overlap with each other, are conducted.

More specifically, an irradiation pattern used in laser welding of the example is the same as that of the laser beam L, which has been explained by using above FIG. 3 and the like. Meanwhile, an irradiation pattern used in laser welding of comparative example 1 and an irradiation pattern used in laser welding of comparative example 2 are respectively shown in FIG. 14 and FIG. 15. In both of the example and the comparative examples in this experiment, laser welding is performed for a segment that is longer than a distance between the advanced laser beam located at the forefront and the subsequent laser beam located at the rearmost.

Figure 14:
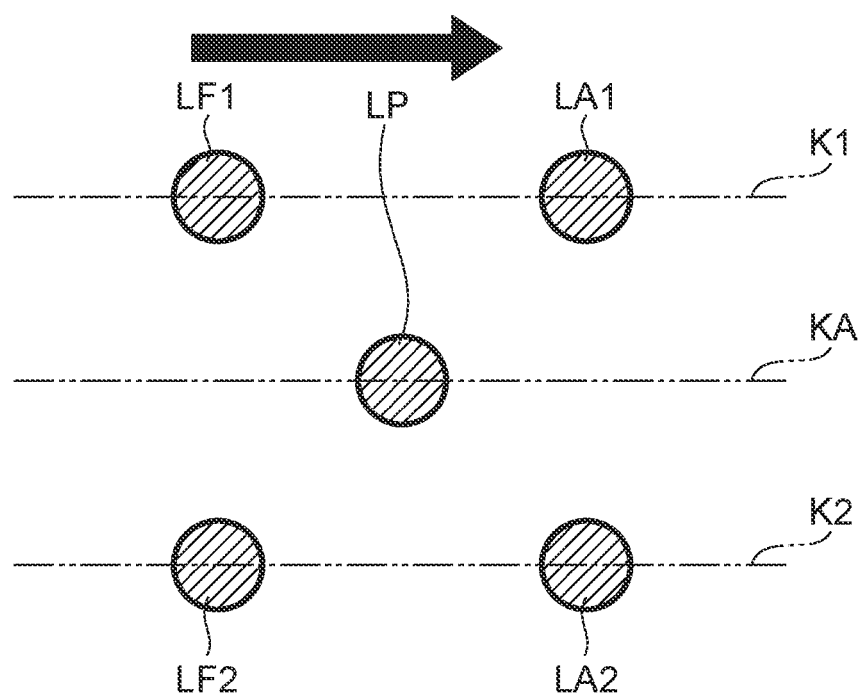
FIG. 14 is a view that shows an irradiation pattern of laser beams in a comparative example.

As shown in FIG. 14, the primary laser beam LP, advanced laser beams LA1, LA2, and subsequent laser beams LF1, LF2 are arranged in the irradiation pattern of comparative example 1. Note that, as shown in FIG. 14, the direction of movement is to the right. In comparative example 1, tracks of the advanced laser beam LA1 and the subsequent laser beam LF1 are common as a track K1. Furthermore, tracks of the advanced laser beam LA2 and the subsequent laser beam LF2 are common as a track K2. That is, in the irradiation pattern in comparative example 1, the subsequent laser beams LF1, LF2 are emitted in such a manner as to respectively overlap at positions where the advanced laser beams LA1, LA2 are emitted.

Figure 15:
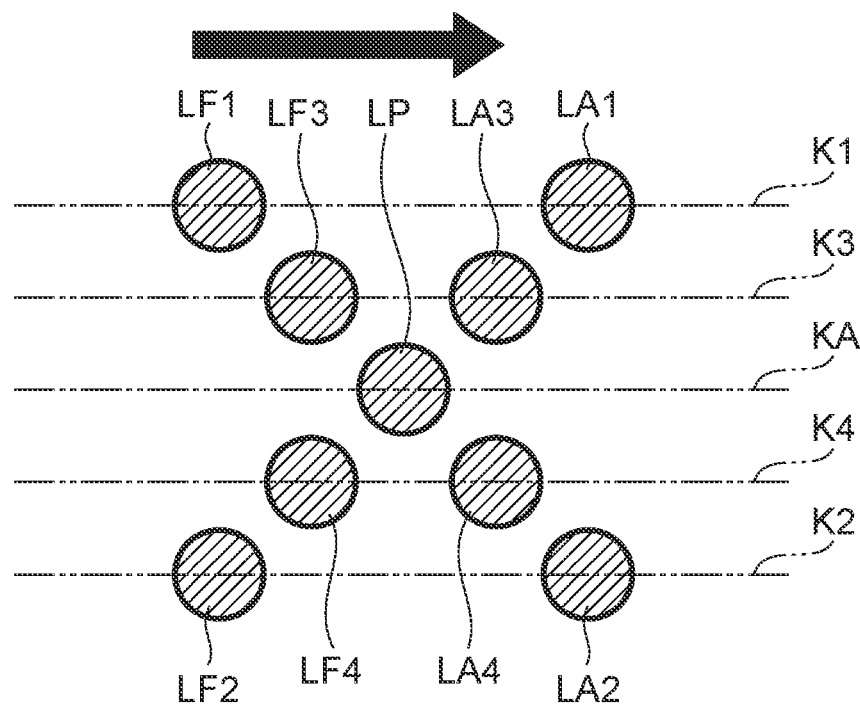
FIG. 15 is a view that shows an irradiation pattern of laser beams in a different comparative example from in FIG. 14.

As shown in FIG. 15, in the irradiation pattern in comparative example 2, advanced laser beams LA3, LA4 and subsequent laser beams LF3, LF4 are added to the irradiation pattern in comparative example 1. Note that, as shown in FIG. 15, the direction of movement is to the right. In addition, in comparative example 2, tracks of the advanced laser beam LA3 and the subsequent laser beam LF3 are common as a track K3. Furthermore, in comparative example 2, tracks of the advanced laser beam LA4 and the subsequent laser beam LF4 are common as a track K4. That is, in the irradiation pattern in comparative example 2, the subsequent laser beams LF1, LF2, LF3, LF4 are emitted in such a manner as to respectively overlap at positions where the advanced laser beams LA1, LA2, LA3, LA4 are emitted.

In this experiment, for the example and the comparative examples, a permissible range of energy was examined in a case where all of the advanced laser beam and the subsequent laser beam had the same energy. More specifically, an irradiation experiment was conducted for the example and the comparative examples under each condition where the energy of each of the advanced laser beam and the subsequent laser beam was changed, and the energy required for the advanced laser beam in front of the primary laser beam to form the melted section was examined. Furthermore, an irradiation experiment was conducted for the example and the comparative examples under each condition where the energy of each of the advanced laser beam and the subsequent laser beam was changed, and energy with which the metal evaporation occurs at an irradiation position of the subsequent laser beam was examined.

Table 1 below shows energy (E1) that is required to form the melted section by the advanced laser beam and energy (E2) with which the metal evaporation occurs by the subsequent laser beam. Note that data in Table 1 was obtained by setting a moving speed of the laser beam as the same speed in all of the example and the comparative examples.

TABLE 1

| | Energy (E1) required to form the melted section by the advanced laser beam | Energy (E2) with which the metal evaporation occurs by the subsequent laser beam | Difference (E2-E1) |
| --- | --- | --- | --- |
| Example | 490 J | 750 J | 260 J |
| Comparative Example 1 | 450 J | 540 J | 90 J |
| Comparative Example 2 | 350 J | 370 J | 20 J |

In each of the example and the comparative examples, the advanced laser beam and the subsequent laser beam with the energy that is at least equal to the energy (E1) required to form the melted section by the advanced laser beam shown in Table 1 have to be emitted. It is because the primary laser beam LP has to be prevented from passing through the gap between the members as the joint targets. In addition, in each of the example and the comparative examples, the advanced laser beam and the subsequent laser beam with the energy that is lower than the energy (E2) with which the metal evaporation occurs by the subsequent laser beam shown in Table 1 have to be emitted. It is because the welding failure has to be suppressed.

As shown in Table 1, in the example, a value of the energy E2, with which the metal evaporation occurs by the subsequent laser beam, is higher than those in the comparative examples. It is because the subsequent laser beam is not emitted in the overlapping manner with the advanced laser beam due to the non-overlapping irradiation in the example while the subsequent laser beam is emitted in the overlapping manner with the advanced laser beam in both of the comparative examples.

Table 1 also shows a difference (E2-E1) between the energy (E1) required to form the melted section by the advanced laser beam and the energy (E2) with which the metal evaporation occurs by the subsequent laser beam. A value of the difference (E2-E1) is higher in the example than in the comparative examples. That is, a permissible range of an energy difference between the advanced laser beam and the subsequent laser beam is wide in the example. Meanwhile, the permissible ranges of the energy difference between the advanced laser beam and the subsequent laser beam are narrow in both of the comparative examples.

As the permissible range of the energy difference between the advanced laser beam and the subsequent laser beam is increased, robustness by laser welding is increased. That is, it is understood that the example is high in robustness than any of the comparative examples. Furthermore, the value of the difference (E2-E1) is high in the example. Thus, the advanced laser beam and the subsequent laser beam can easily be adjusted in such a manner as to be emitted with the energy within the permissible range that is at least equal to E1 and is lower than E2.

That is, in the example according to this embodiment, the metal evaporation by the subsequent laser beam can be suppressed while the appropriate melted section is formed by the advanced laser beam. Accordingly, failure can be reduced.

Furthermore, laser welding can be performed at the high speed while the occurrence of the failure is suppressed. It is because the permissible range of the energy difference between the advanced laser beam and the subsequent laser beam is wide and the robustness is high in the example according to this embodiment.

As it has been described in detail so far, laser welding of the case body 10 and the sealing plate 20 is performed by using the laser beam L of the welding apparatus 100 in this embodiment. The laser beam L is configured by including the advanced laser beam LA, the primary laser beam LP, and the subsequent laser beam LF in the straight segments (the first longitudinal straight segment X1, the second longitudinal straight segment X2, the first short straight segment Y1, and the second short straight segment Y2). Then, the non-overlapping irradiation is performed, in which the irradiation trajectories of any two of these advanced laser beam LA, the primary laser beam LP, and the subsequent laser beam LF do not overlap with each other while the primary laser beam LP scans the boundary between the case body 10 and the sealing plate 20 in the straight segments. In this way, a manufacturing method for a welded structure capable of performing laser welding at the high speed while suppressing the occurrence of the failure is realized.

Note that this embodiment is merely illustrative and does not limit the present disclosure in any respect. Thus, various improvements and modifications can naturally be made to the present disclosure within a scope that does not depart from the gist thereof. For example, the irradiation pattern of the laser beam L is not limited to the irradiation pattern in which the primary laser beam LP is located at the center of gravity of the square S with the secondary laser beams LB, LC, LD, LE being the vertices. More specifically, an irradiation pattern in such arrangement that the primary laser beam LP is located at the center of gravity of a rectangle with the secondary laser beams LB, LC, LD, LE being vertices can also be adopted, for example. In this case, the non-overlapping irradiation can be performed in the same irradiation pattern under the same condition in the first longitudinal straight segment X1 and the second longitudinal straight segment X2 that are the segments in which the directions of movement oppose each other. In addition, the non-overlapping irradiation can be performed in the same irradiation pattern under the same condition in the first short straight segment Y1 and the second short straight segment Y2 that are the segments in which the directions of movement oppose each other.

The detailed description has been made in the above embodiment, for example, on the case where laser welding is performed for the circumference of the rectangular shape by the welding apparatus 100. However, the welding apparatus 100 can also be used for laser welding in a case where a boundary that is formed by opposing and abutting end surfaces of two members against each other has only a straight portion, for example. Because it is difficult to make both of the end surfaces of the two members completely flat surfaces, a gap is possibly formed in the boundary therebetween. Also, in such a case, laser welding can be performed by using the welding apparatus 100 so as to prevent the laser beam from passing through the gap.

For example, in the case where the boundary that is formed by opposing and abutting the end surfaces of the two members only has the straight portion, the advanced laser beam and the subsequent laser beam do not have to be always symmetrical about the axis that passes through the irradiation position of the primary laser beam and is inclined with respect to the direction of movement. That is, in the case where laser welding does not have to be performed in the segments in which the directions of movement oppose each other, the advanced laser beam and the subsequent laser beam do not have to be provided in a symmetrical manner about the axis that is inclined with respect to the direction of movement.

This embodiment will be summarized. In the manufacturing method for the welded structure according to the present disclosure, the primary laser beam that scans a boundary between a first member and a second member, the advanced laser beam whose irradiation position is in front of the primary laser beam in the direction of movement, and the subsequent laser beam whose irradiation position is at the rear of the primary laser beam in the direction of movement are emitted by the welding apparatus. In addition, the non-overlapping irradiation is performed in which, while the advanced laser beam is emitted along an advanced trajectory that does not overlap a primary trajectory on which the primary laser beam is emitted, the subsequent laser beam is emitted along a subsequent trajectory that does not overlap the primary trajectory and the advanced trajectory.

In the above embodiment, the description has been made on the example of the case where the case body 10 and the sealing plate 20 that are made of aluminum are joined by laser welding to form the welded structure. However, the present disclosure can naturally be applied to manufacturing of a welded structure other than the members related to the battery. In addition, the present disclosure can be applied to a combination of materials that are not limited to aluminum as long as the materials can be joined by laser welding.

What is claimed is:

1. A manufacturing method for a welded structure, the welded structure being manufactured by joining a boundary between a first member and a second member that abut against each other by laser welding using a welding apparatus, and the welding apparatus that emits a primary laser beam scanning the boundary between the first member and the second member, an advanced laser beam that an irradiation position of the advanced laser beam is in front of an irradiation position of the primary laser beam in a direction of movement, and a subsequent laser beam that an irradiation position of the subsequent laser beam is at rear of the irradiation position of the primary laser beam in the direction of movement, the manufacturing method comprising:
emitting the primary laser beam along a primary trajectory on the boundary between the first member and the second member by the welding apparatus;
emitting the advanced laser beam along an advanced trajectory that does not overlap the primary trajectory by the welding apparatus; and
emitting the subsequent laser beam along a subsequent trajectory that does not overlap the primary trajectory and the advanced trajectory by the welding apparatus.

2. The manufacturing method according to claim 1, wherein
the advanced laser beam and the subsequent laser beam are emitted by the welding apparatus such that the irradiation position of the advanced laser beam and the irradiation position of the subsequent laser beam become symmetrical about an inclination axis, the inclination axis passes through the irradiation position of the primary laser beam, and the inclination axis is inclined with respect to the primary trajectory, the advanced laser beam includes a first advanced laser beam and a second laser beam, an irradiation position of the first advanced laser beam is on the first member side of the primary trajectory, and an irradiation position of the second advanced laser beam is on the second member side of the primary trajectory, and as the subsequent laser beam includes a first subsequent laser beam and a second subsequent laser beam, an irradiation portion of the first subsequent laser is on the first member side of the primary trajectory, and an irradiation position of the second subsequent laser beam is on the second member side of the primary trajectory.

3. The manufacturing method according to claim 1, wherein a melted section is formed in front of the irradiation position of the primary laser beam on the primary trajectory by melting the irradiation position of the advanced laser beam with the advanced laser beam, depth of the melted section at the irradiation position of the primary laser beam is made greater by the primary laser beam than depth of the melted section before irradiation of the primary laser beam, and depth of the melted section at the irradiation position of the subsequent laser beam is made greater by the subsequent laser beam than depth of the melted section before irradiation of the subsequent laser beam.

* * * * *